United States Patent [19]

Mizuno et al.

[11] Patent Number: 5,032,775
[45] Date of Patent: Jul. 16, 1991

[54] CONTROL APPARATUS FOR PLANE WORKING ROBOT

[75] Inventors: Sueyoshi Mizuno; Yuuji Takiguchi, both of Yokohama; Tetsushi Koshiyama, Mitaka, all of Japan

[73] Assignee: Kabushiki Kaisha Toshiba, Kawasaki, Japan

[21] Appl. No.: 533,456

[22] Filed: Jun. 5, 1990

[30] Foreign Application Priority Data

Jun. 7, 1989 [JP] Japan .................. 1-145006

[51] Int. Cl.$^5$ .................. G05D 1/02; B62D 11/04
[52] U.S. Cl. .................. 318/587; 318/580; 15/319; 180/169; 901/1; 364/513
[58] Field of Search .................. 318/580-589; 901/1; 364/424.01, 424.02; 180/168, 169, 170, 171, 167; 15/319, 320

[56] References Cited

U.S. PATENT DOCUMENTS

| 4,114,711 | 9/1978 | Wilkins | 180/169 |
| 4,306,329 | 12/1981 | Yokoi | 15/319 |
| 4,638,445 | 1/1987 | Mattaboni | 901/1 X |
| 4,658,385 | 4/1987 | Tsuji | 901/1 X |
| 4,674,048 | 6/1987 | Okumura | 318/587 X |
| 4,700,427 | 10/1987 | Knepper | 318/587 X |
| 4,809,178 | 2/1989 | Ninomiya et al. | 318/587 X |
| 4,878,003 | 10/1989 | Knepper | 318/580 X |
| 4,924,153 | 5/1990 | Toru et al. | 180/169 X |

Primary Examiner—Paul Ip
Attorney, Agent, or Firm—Foley & Lardner

[57] ABSTRACT

A control apparatus for controlling a plane working robot comprise a running unit for running on a plane surface, a steering unit for steering the running unit in a predetermined direction, a working unit for performing predetermined plane working such as cleaning, and a detecting unit for detecting information about running direction and distance of the robot and an obstacle on the plane surface, thus permitting the working robot to take an optimum running path while avoiding an obstacle on the basis of sensor outputs from the detecting unit. This control apparatus comprises a working information setting element for setting a working area where the plane working is conducted, and for setting an optimum working running path within the set working area in accordance with a predetermined algorithm, and a working control element for controlling the running unit and the steering unit so that the running unit allows the robot to run along the working running path set by the working information setting element, and for controlling the working unit so that the robot conducts a predetermined work during running.

7 Claims, 14 Drawing Sheets

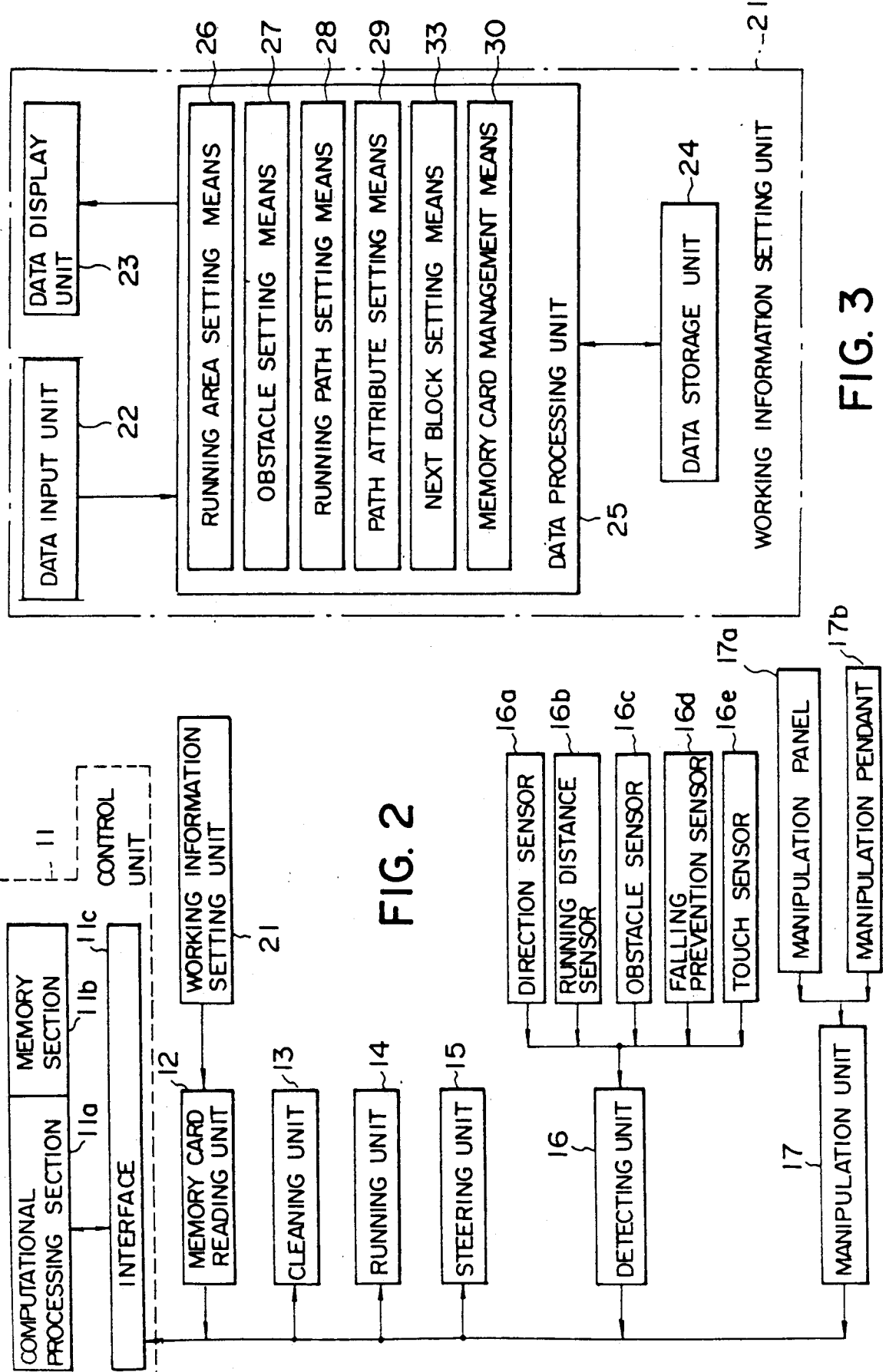

```
                                                     ┌─171
┌─────────────────────────────────────────────────────────┐
│                                                         │
│  NAME OF WORKING PLACE _____ F BLOCK NO. _____        │
│  NEXT BLOCK NO. :                                       │
│  STARTING DIRECTION : BEFORE  BEHIND  LEFT  |RIGHT|     │
│  TRAVELING DISTANCE : X _____ , Y _____               │
│                                                         │
│                                                         │
└─────────────────────────────────────────────────────────┘
```

CONTROL APPARATUS FOR PLANE WORKING ROBOT

BACKGROUND OF THE INVENTION

This invention relates to a control apparatus for a plane working robot. More particularly, it relates to an apparatus for controlling a running path of a working robot for conducting work such as cleaning, painting, finishing or inspecting, etc. with respect to a plane portion such as a floor surface, a wall surface or a window, of a building while self-running along a predetermined running path.

Generally, for all working robots to work while self-running on a plan an surface, it is necessary to control their running paths in accordance with a predetermined control method. As such plane working robots, various kinds of robots are used in many fields. There are proposed e.g., a robot for cleaning the floor surface of a structure such as a building, or the bottom surface of a pool or a water tank while self-running, a floor finishing robot for leveling or polishing the concrete floor of a building being constructed, a wall surface working robot for carry our work such as cleaning or tile-setting etc. to a vertical plane such as a wall surface or a window of a building, a robot for carrying goods or parts, etc. while self-running within a warehouse or a factory, and a robot for performing various inspections in especially dangerous places such as a transforming station and the like. For these, plane working robots, the running path during self-running should be efficiently controlled and various constraints of the working environment must be overcome.

A control apparatus for an automatic cleaning robot as an example of the above-mentioned running path control apparatus will now be described.

In the conventional control apparatus, the following procedure is implemented. Namely, a cleaning robot is caused to self-run along an obstacle such as a wall or guide means, such as a groove, prior to actual learning to store an external edge of a working area in advance. A running path within the working area is then computed in accordance with a predetermined algorithm on the basis of the area external edge information, thus to determine the running path. The method of determining the running path will be described with reference to FIGS. 25 and 26.

The area whose periphery is encompassed by a guide object 262 as shown in FIG. 26 is assumed as a cleaning area 260. Initially, an automatic cleaning robot R is positioned at a start position 262 of the cleaning area 260. Then, the setting button of a manipulation unit 17 having a panel 17a and pendant 17b, (not illustrated in FIG. 26) is depressed to input coordinates ($x_o$, $y_o$) of the start position 262 and a reference $\theta_o$ in a traveling direction to a computational processing section 251 of a control unit 250 (see FIG. 25) through an interface 253. These values are thus set. Then, the robot R is caused to learn by running around path 263 along the guide object 261 such as a wall. Thus, the computational processing unit 251 computes, every moment, a current position (x, y) and a traveling direction $\theta$ on the basis of sense signals transmitted through the interface 253 from a detecting unit 16 such as a direction sensor 16a, a running distance sensor 16b, and an obstacle sensor 16c. The unit 16 also has a fall prevention sensor 16d and touch sensor 16e. The computational processing unit 251 sequentially transmits computed results to a memory section 252 to allow the memory section 252 to store and hold them therein, and to determine the cleaning area 260 on the basis of these computed results, thus to compute an optimum running path 264 within the determined cleaning area 260. Then, the computational processing unit 251 controls a running unit 14 and a steering unit 15 through the interface 253 so that the learning robot R runs along the computed running path while learning using a cleaning unit 13. The robot R is stopped at a terminating position 265.

In such a conventional automatic working robot such as the cleaning robot R, it is necessary that the working area is partitioned by an obstacle or a guide object such as a wall, etc. For this reason, there was the problem that the working area could not be set unless an obstacle or a guide such as a wall, etc. was present, and therefore the work could not be automatically carried out as a matter of course. Accordingly, when working in an area which was not partitioned by a guide object, etc., it was necessary to install a suitable guide object. The work required for installing a guide object was very troublesome. Consequently, when working for an area which was not partitioned by a guide object, etc., the working robot demonstrated low efficiency and lackness in flexibility.

In addition, where the working area was altered, it was required to carry a working robot to the altered working area each time to allow the working robot to learn by running along the outer periphery of that working area for a second time, resulting in the problem that the work took much time.

SUMMARY OF THE INVENTION

With the above circumstances in view, this invention has been made, and its object is to provide a control apparatus capable of allowing the working robot to conduct self-running work even if there is no guide object such as a wall, etc.

This invention provides a control apparatus for a plane working robot comprising a running unit for running on a plane surface, a steering unit for steering the running unit in a predetermined direction, a working unit for performing predetermined plane working on the plane surface, a detecting unit for detecting various actual data about running direction and distance of the robot and an obstacle on the plane surface, and a control unit for controlling the running unit, the steering unit and the working unit, on the basis of the data detected by the detecting unit to allow a working robot to run in a working area so that the working robot conducts work on a plane, characterized by the provision of working information setting means for setting a working area where the plane working is conducted to set an optimum working running path within the working area thus set by a predetermined algorithm, and working control means for controlling the running unit, the steering unit and the working unit so that the running unit runs along a running path set by the working information setting means whereby the working unit carries out predetermined work.

In accordance with the control apparatus for a plane working robot of this invention thus constructed, a working area is set by the working information setting means and an optimum running path for working within the working area thus set is automatically set. The running unit, the steering unit and the working unit are controlled so that the running unit runs along the optimum running path for working and the working unit carries out predetermined work. Thus, self-running work can be conducted even if there is no guide object such as a wall or a groove, etc.

BRIEF DESCRIPTION OF THE DRAWINGS

In the accompanying drawings:

FIG. 2 is a block diagram showing the functional configuration of the control apparatus according to the first embodiment of this invention;

FIG. 3 is a block diagram showing the functional configuration of the working information setting means 21 in the first embodiment;

DETAILED DESCRIPTION OF THE PREFERRED EMBODIMENTS

Preferred embodiments of a running path control apparatus for a plane self-running working robot according to this invention will be described with reference to the attached drawings. In this specification, an explanation will be made by taking an example of a floor surface automatic cleaner as a representative of the self-running working robot.

Figure 1:
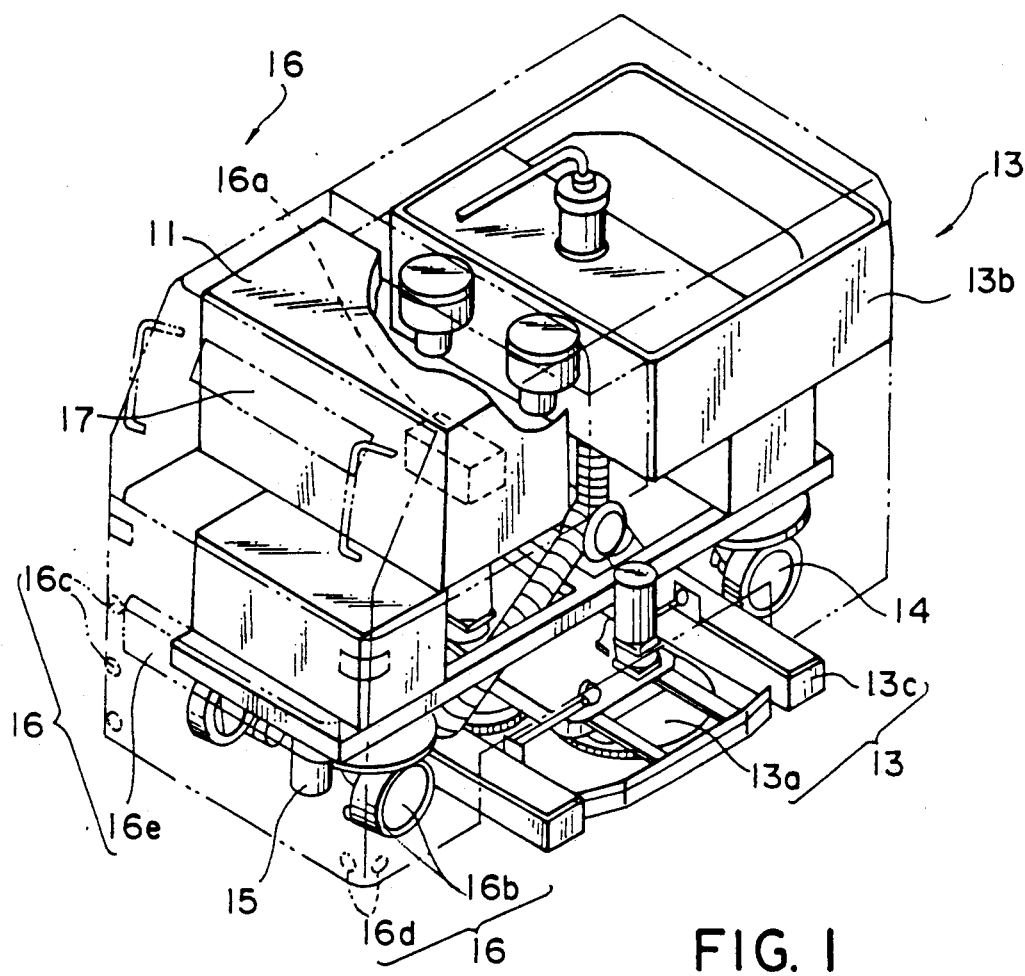
FIG. 1 is a perspective view showing the appearance of an automatic cleaner (robot) as a first embodiment of a plane working robot control apparatus according to this invention.

A first embodiment of an automatic cleaner as a plane working robot according to this invention will be described with reference to FIGS. 1 to 23. The automatic cleaner of the first embodiment is shown in FIGS. 1 and 2. The automatic cleaner 1 of the first embodiment comprises a control unit 11, a memory card reading unit 12, (see FIG. 4) a cleaning unit 13 as a working unit, a running unit 14, a steering unit 15, a detecting unit 16, a manipulation unit 17, and a working information setting unit 21 such as cleaning area setting means (not shown).

The cleaning unit 13 comprises a cleaning tool 13a, a cleaning liquid supply unit 13b for supplying a cleaning liquid required for cleaning, and a collection unit 13c for collecting filth produced as the result of cleaning. The detecting unit 16 comprises a direction sensor 16a, a running distance sensor 16b, an obstacle sensor 16c, a falling prevention sensor 16d, and a touch sensor 16e. The direction 16a is comprised of a gyro-device to output attitude angle information for an attitude control of the running unit 14. The running distance sensor 16b is attached on the running unit 14 to sense a running distance. The obstacle sensor 16c senses a distance up to an obstacle on a wall surface and a floor surface of the cleaning area. The falling prevention sensor 16d is senses a platform or a stair-step. This sensor 16d is used for preventing the automatic cleaner 1 as the working robot from falling. The touch sensor 16e is provided on the front surface of the automatic cleaner 1 to directly contact an obstacle such as a wall surface, etc. to sense presence of that obstacle, thus to conduct an emergency stop of the automatic cleaner 1. In addition, the manipulation unit 17 (see FIG. 2) is comprised of a manipulation panel 17a and a manipulation pendant 17b. An operator manually operates the manipulation pendant 17b to allow the automatic cleaner 1 to carry out a running or cleaning operation.

The functional configuration of the control unit 11 is shown in FIG. 2, and the functional configuration of the working information setting means 21 is shown in FIG. 3. In FIG. 3, the working information setting means 21 comprises a data input unit 22, a data display unit 23, data processing unit 25, and a data storage unit 24. The data input unit 22 is used for inputting data required for setting working information such as cleaning information. The data processing unit 25 comprises running area setting means 26, obstacle setting means 27, running path setting means 28, path attribute setting means 29, memory card management means 30, and next block setting means 33. This data processing unit 25 sets working information on the basis of data inputted through the data input unit 22. The data display unit 23 is used for displaying data inputted through the data input unit 22 and data processed by the data processing unit 25 (see FIG. 4). The data storage unit 24 stores working information set by the data processing means 25 into the memory card 32 (see FIG. 4). It is to be noted that the working information setting means 21 is generally provided separately from a body of the automatic cleaner 1.

Figure 4:
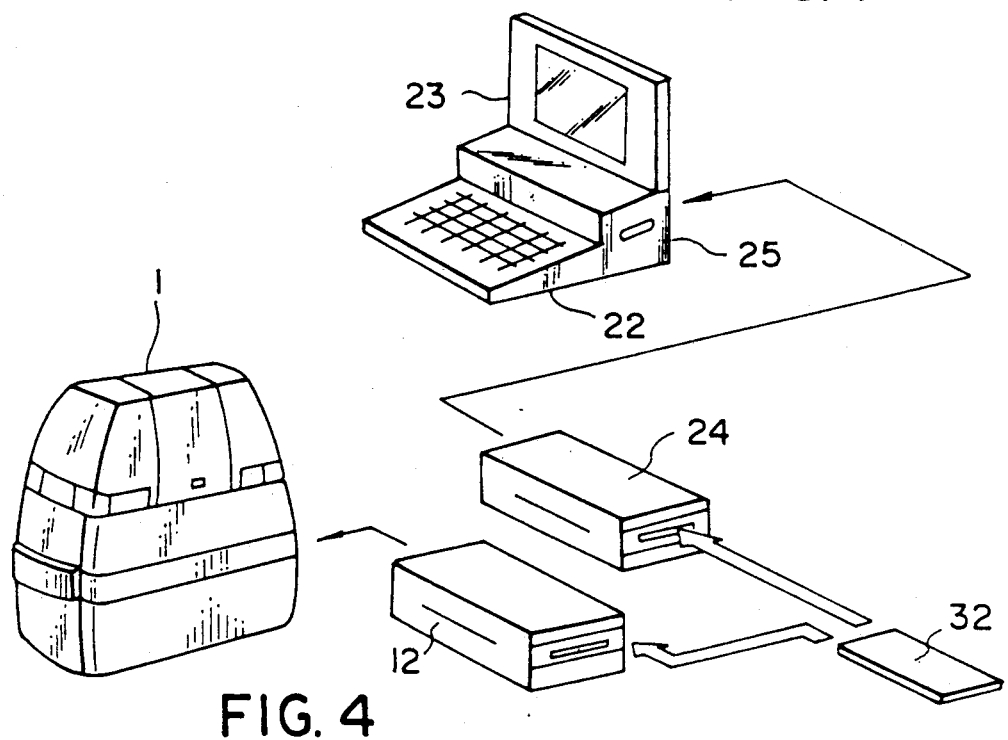
FIG. 4 is a diagrammatical view showing an information transmitting path in the first embodiment.
Figure 5:
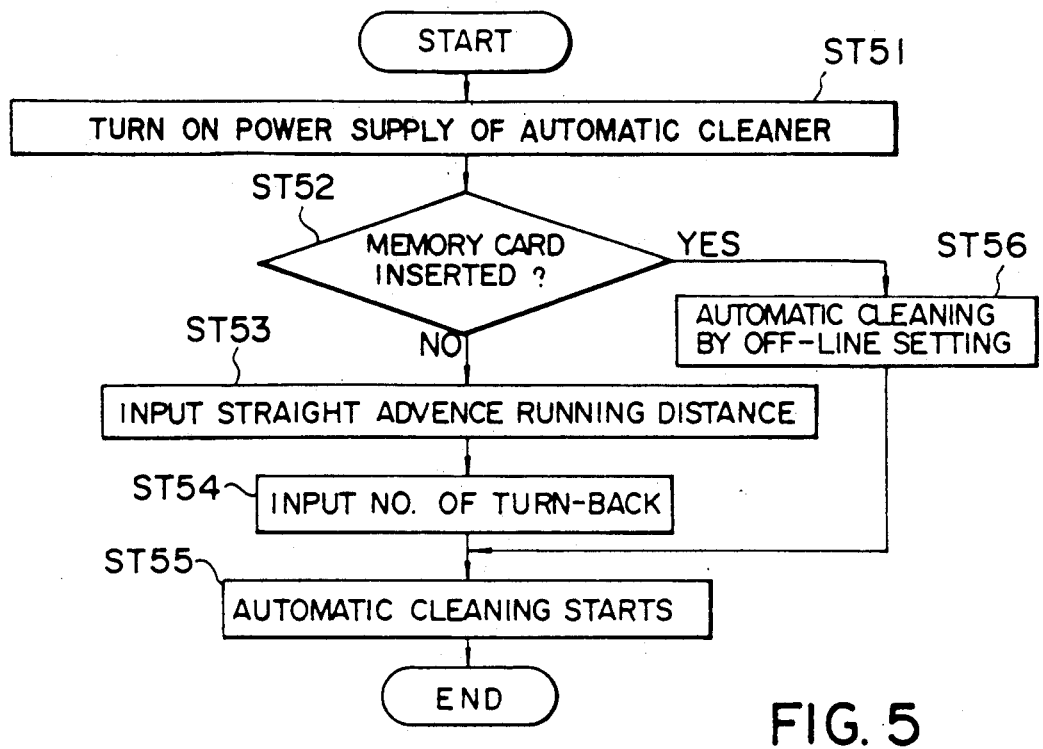
FIG. 5 is a flowchart showing the basic operation of the robot control apparatus according to the first embodiment.

The memory card reading unit 12 is used for reading working information stored in the memory card 32 and is provided on the body of the automatic cleaner 1 (see FIG. 4).

The control unit 11 comprises a computational processing section 11a, a memory section 11b, and an interface 11c. This control unit 11 controls the running unit 14, the steering unit 15 and the cleaning unit 13 on the basis of cleaning information read by the memory card reading unit 12 or cleaning information inputted through the manipulation unit 17, and sense outputs from various sensors 16a, ..., 16e of the detecting unit 16.

The operation of the first embodiment will now be described. Initially, the basic operation steps will be explained in accordance with the flowchart shown in FIG. 5. An operator sets cleaning information, i.e., a cleaning area and various working conditions within the cleaning area, by using the working information setting means 21, on the basis of complexity of the shape of a cleaning area that the operator intends to clean and the presence and absence of an obstacle in a working area including the cleaning area, or sets a cleaning area by using the manipulation unit 17 as in the prior art, thus to determine over which range and along which running path the automatic cleaning unit will utilize. In the case of setting cleaning information by using the working information setting means 21, cleaning information is set thereafter to store this cleaning information into the memory card 32 of the memory medium. Then, the power supply of the automatic cleaner 1 is turned on (step ST51 of FIG. 5).

It is to be noted that the memory card 32 in which cleaning information is stored is inserted before the power supply is turned on. After the power supply is turned on, the control unit 11 checks whether or not the memory card 32 is inserted into the memory card reading unit 12 (see step ST52 of FIG. 5) to carry out automatic cleaning on the basis of cleaning information set by the working information setting means 21 if the memory card 32 is inserted (see step ST55). In contrast, when the memory card 32 is not inserted, a straight advance running distance and the number of turn-back operations are inputted by using the manipulation panel 17a of the manipulation unit 17 to set cleaning information required for work such as the contents of the cleaning work and/or the cleaning speed, etc., thus to carry out an automatic cleaning (set steps ST53, ST54 and ST55). For automatic cleaning, the cleaning information thus set and various sense outputs from the detecting unit 16 are subjected to data processing at the computational processing section 11a of the control unit 11. Thus, the cleaning unit 13, the running unit 14 and the steering unit 15 are drive-controlled.

The operation of the working information setting means 21 of the automatic cleaner 1 will now be described mainly with reference to the flowcharts shown in FIGS. 6 to 12.

With respect to the preparation of the memory card 32, it is first confirmed at step ST61 that the memory card is inserted. At step ST62, a format of the memory card is read in the case of performing the format of the memory card. In the case of reading out an existing file to implement cleaning in a cleaning area which was previously cleaned in the same manner as the previous manner, information already recorded in the memory card 32 is read at step ST63. The content thereof is grasped at step ST64. Where there is a need to alter various setting contents, the procedure carries out step ST65 to return to the initial step ST61. When the preparation of a new running file is required, the preparation is performed by the following control steps.

An explanation will be made in connection with the case where the preparation of a new running file is selected in the flowchart shown in FIG. 6.

Figure 6:
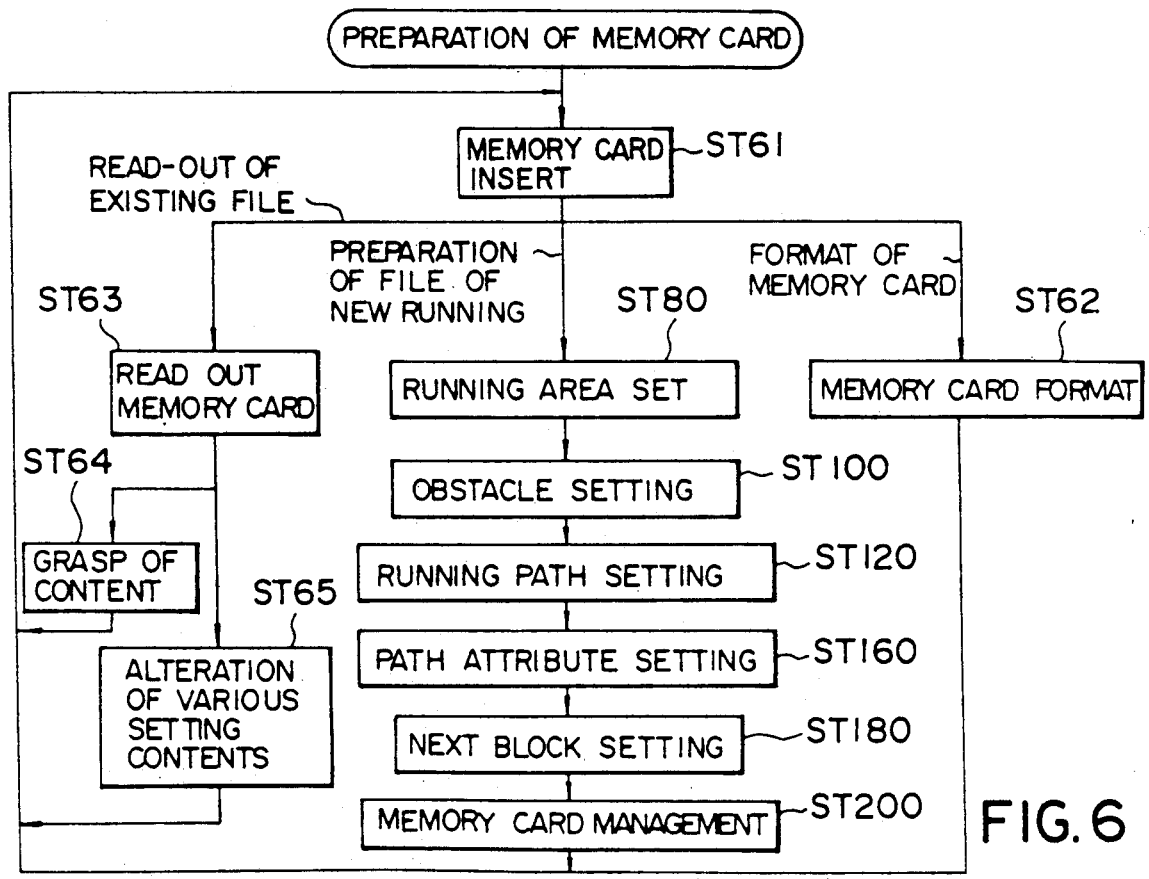
FIG. 6 is a flowchart showing a procedure for preparing a memory card of the control apparatus according to the first embodiment.

The processing carried by the running area setting means 26 shown in the step ST80 of FIG. 6 is as follows.

Figures 7, 8:
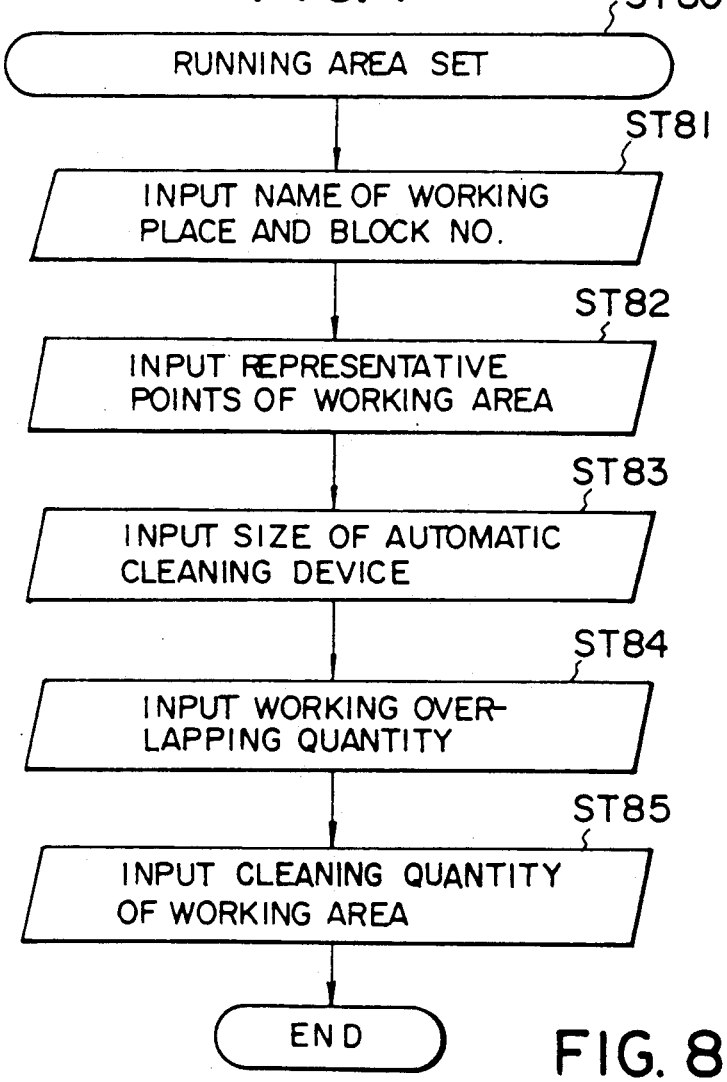
FIGS. 7 and 8 are a front view and a flowchart showing an input picture and a setting procedure in regard to the running area setting in the first embodiment, respectively.
Figure 9:
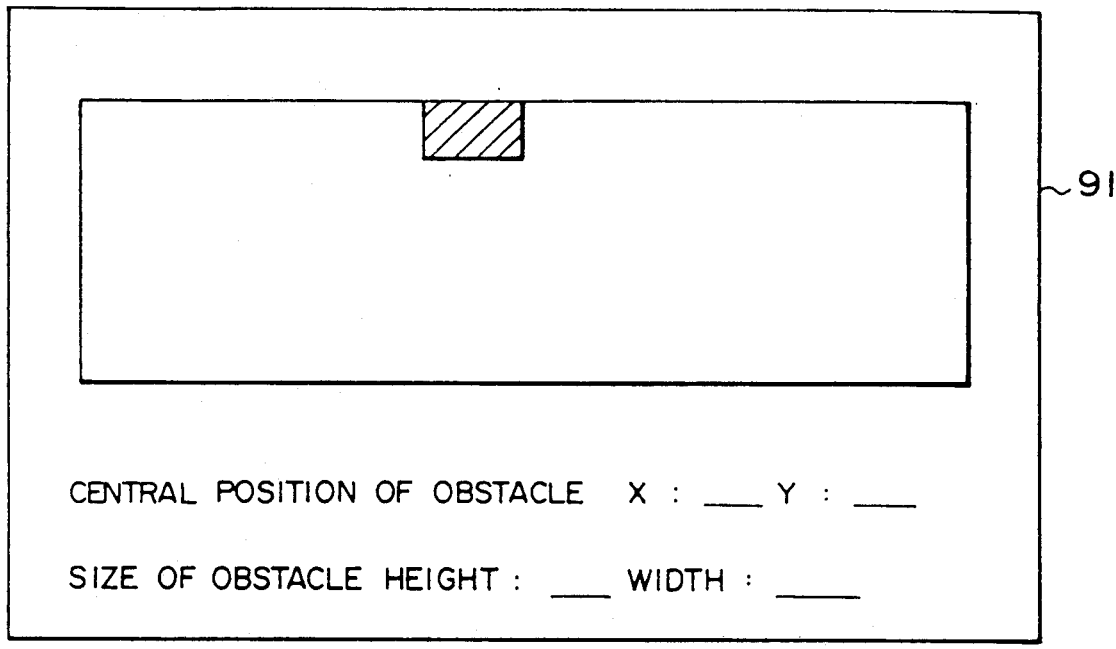
FIGS. 9 and 10 are a front view and a flowchart showing an input picture and a setting procedure in regard to the obstacle setting in the first embodiment, respectively.

The necessary items at the time of setting the running area are shown as a running area setting picture 71 of FIG. 7. The setting procedure is as shown in the flowchart of FIG. 8. Initially, the name of a working place where the automatic cleaner 1 carries out cleaning work is inputted (see step ST81). Thereafter, representative points of an area where the work is required to be carried out by the automatic cleaner 1 are inputted (see step ST82). Then, at steps ST83, ST84 and ST85, a size of the automatic cleaner 1, and a lapping quantity of cleaning paths and a quantity indicating to what extent cleaning should be carried out in the working area when the automatic cleaner 1 cleans the working area. Thus, the running area setting is completed. In this embodiment, with respect to the lapping quantity of cleaning paths, where data input is not carried out, an optimum lapping quantity is automatically determined from the running area and the size of the robot (step ST84). In step ST 85, a cleaning quantity is set.

Figure 10:
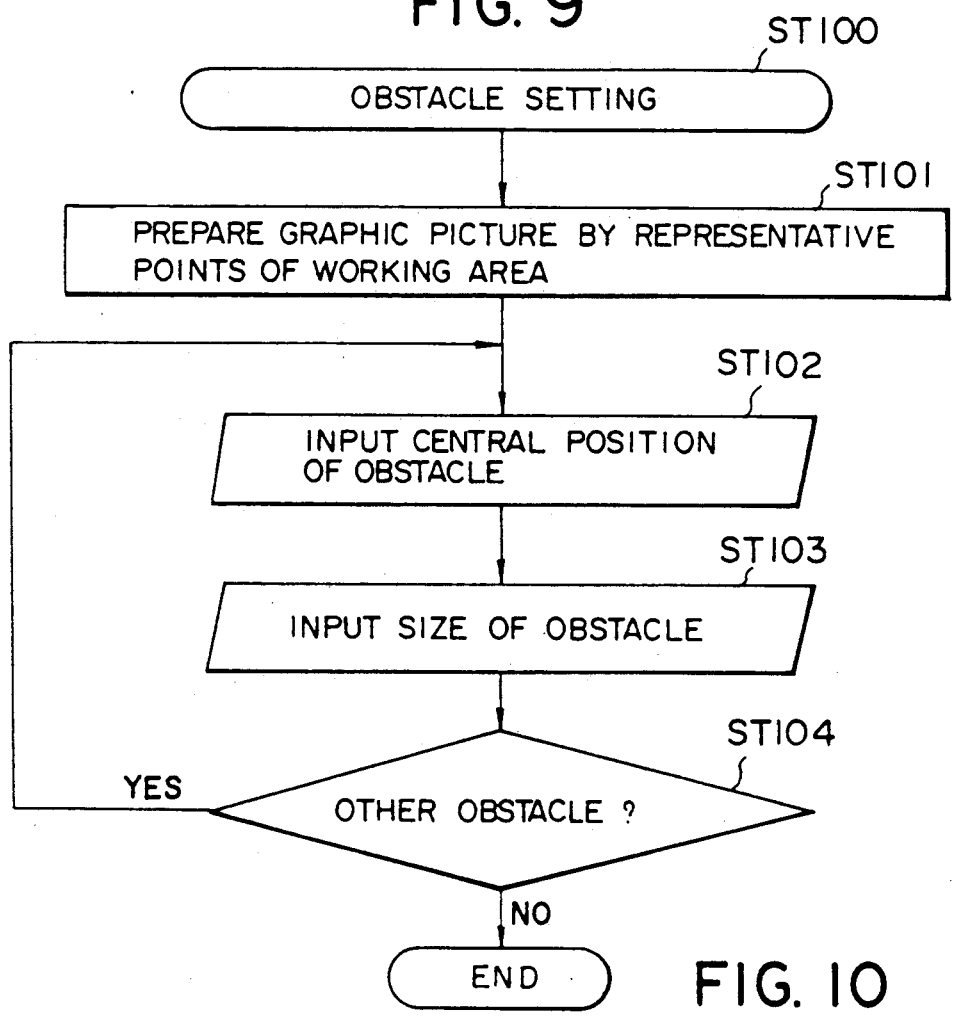
Figure 11:
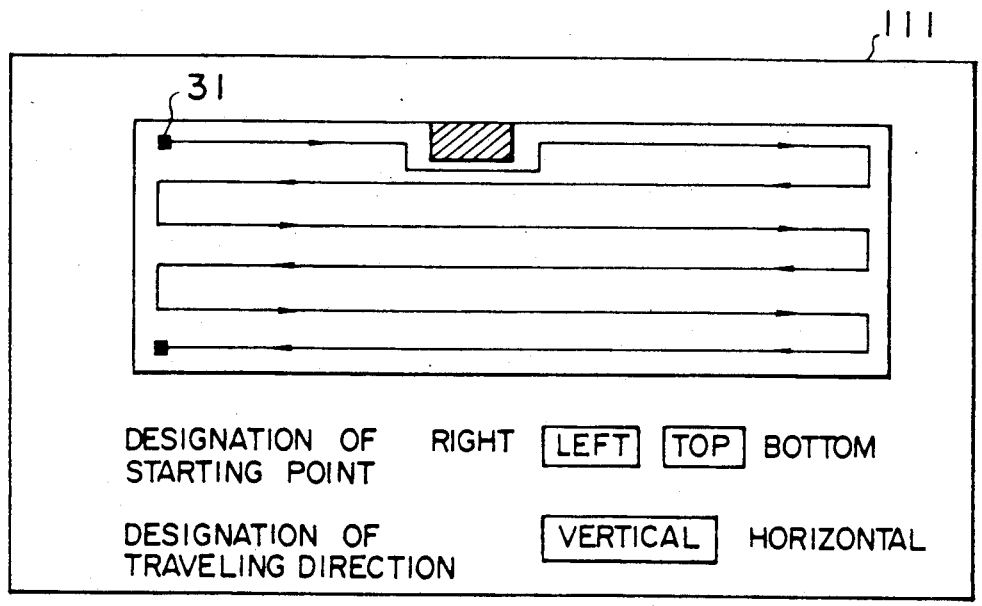
FIGS. 11 and 12 are a front view and a flowchart showing an picture and a setting procedure in regard to the running path setting in the first embodiment, respectively.
Figure 12:
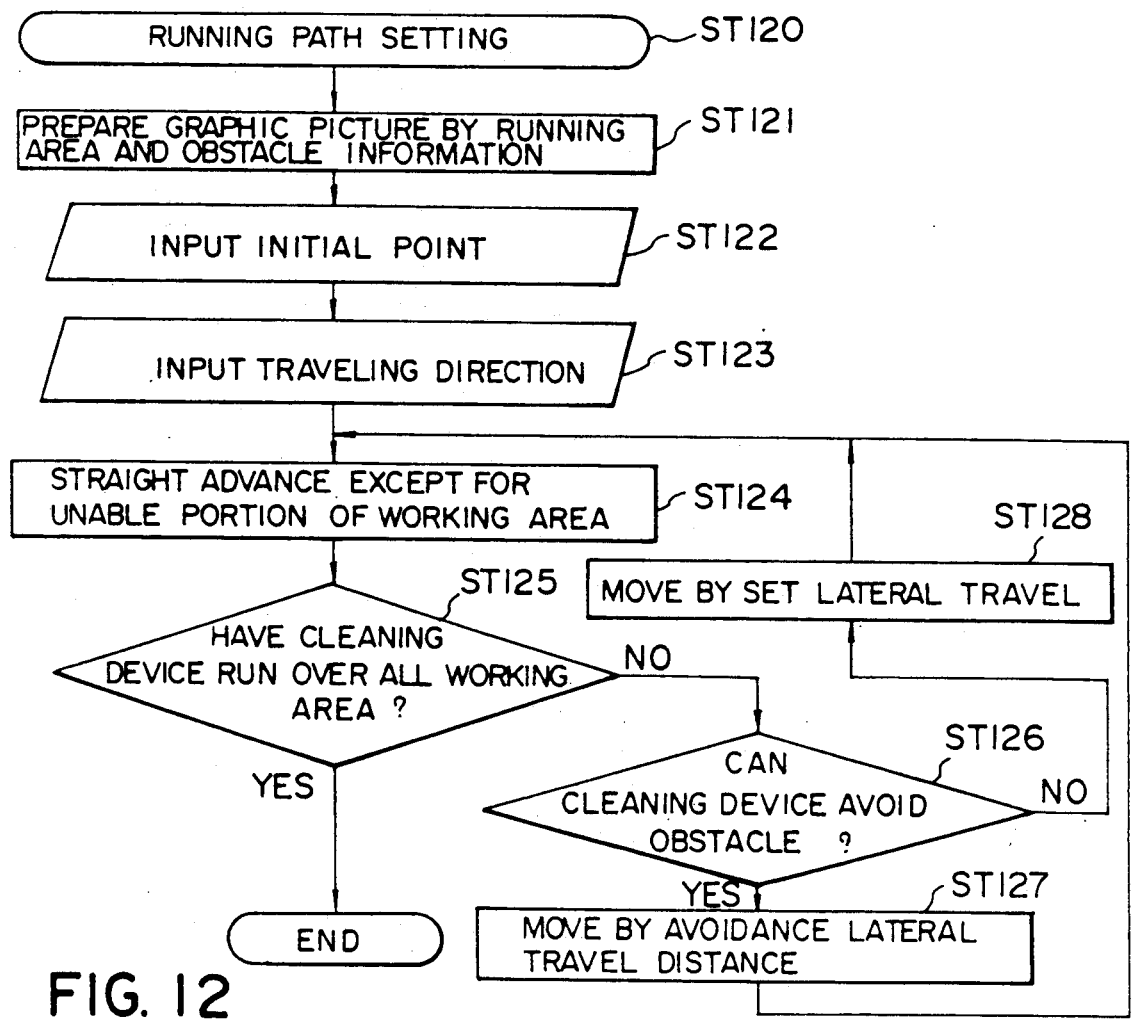

The processing carried by the obstacle setting means 27 as indicated by the step ST100 of FIG. 6 will now be described. The necessary items at the time of setting an obstacle are shown as an obstacle setting picture 91 of FIG. 9. Further, the setting procedure is as indicated by the flowchart of FIG. 10. A working area diagram prepared in advance by the running area setting means 26 is described (see step ST101). The central position of an obstacle and the size thereof which are known in advance are inputted (see steps ST102 and ST103). Further, where there is still a need for setting an obstacle, input operations are repeatedly conducted in the same manner as stated above.

The processing carried out by the running path setting means 28 are indicated by the step ST120 of FIG. 6 will now be described. The necessary items at the time of setting a running path is shown as a running path setting picture 111 of FIG. 11. The running path setting means 28 describes working area information already prepared by the running area setting means 26 and the obstacle setting means 27 as indicated by a flowchart of FIG. 12 (see step ST121). Data indicating a vertex of the set area from which cleaning is initiated are inputted (see step ST122), and data indicating a direction of allowing the cleaner to run are inputted (see step ST123). Then, straight advance operation is continued except for a unable to be worked portion until an obstacle is found out (see step ST124) to judge whether or not the entire working area is subjected to cleaning (step ST125). Where any working area still exists after judgment a judgment is made so as to continue a working. When an obstacle is found out, a judgment is made as to whether or not the automatic cleaner 1 can avoid that obstacle (see step ST126). If it is judged that the automatic cleaner 1 can avoid that obstacle, it avoids that obstacle by a distance corresponding to the width thereof to continue straight advance operation (see step ST127). In contrast, where it is judged that the automatic cleaner 1 cannot avoid that obstacle, it laterally advances by a set lateral advance distance (see step ST128), thus to generate a running path so that the automatic cleaner can carry out a cleaning of a working area everywhere.

Figure 13:
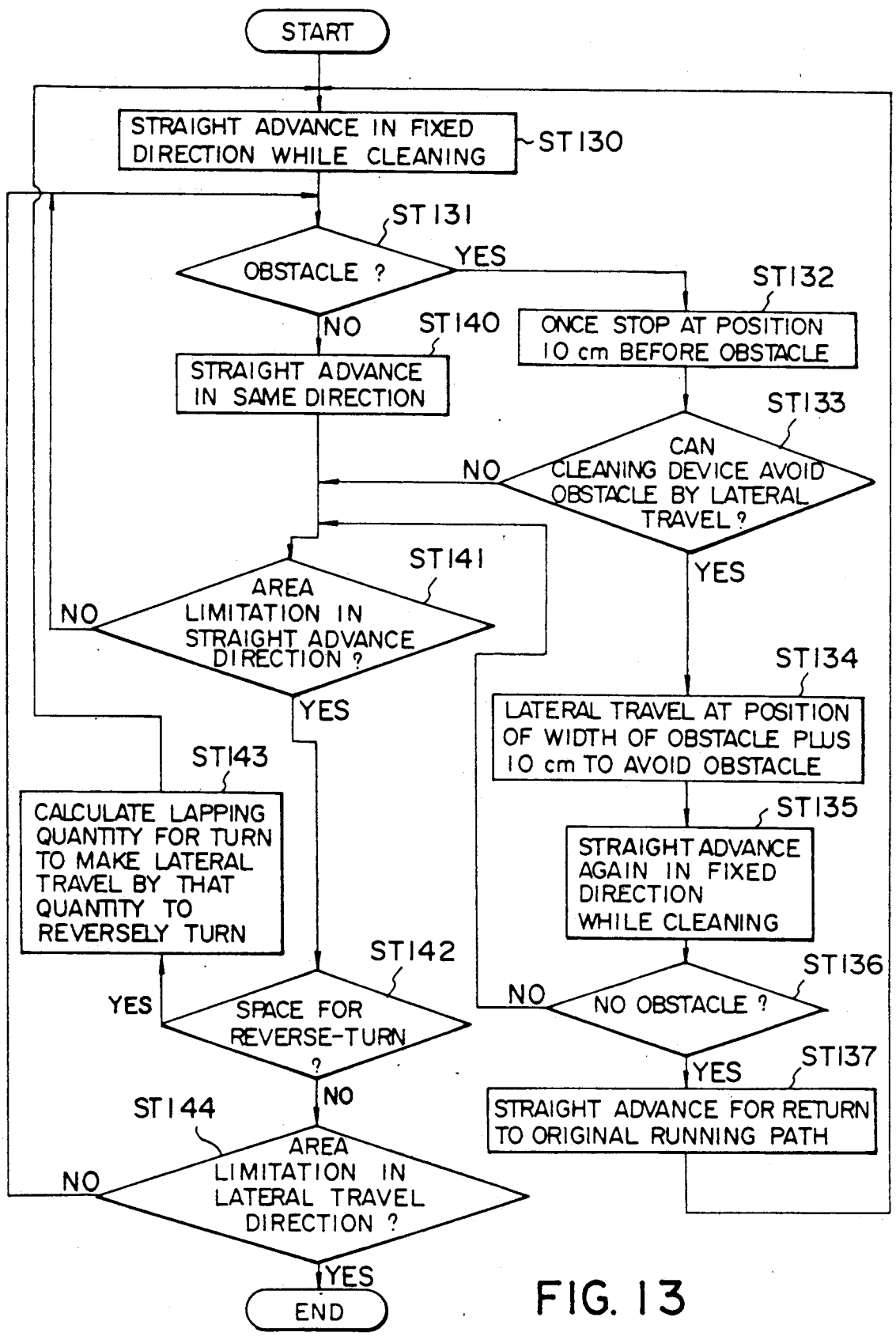
FIGS. 13 and 14A to 14C are a flowchart showing a practical algorithm in regard to the running path setting and a plane showing a cleaning area and a running path in a complicated circumstance in the control apparatus of the first embodiment, respectively.
Figure 14A:
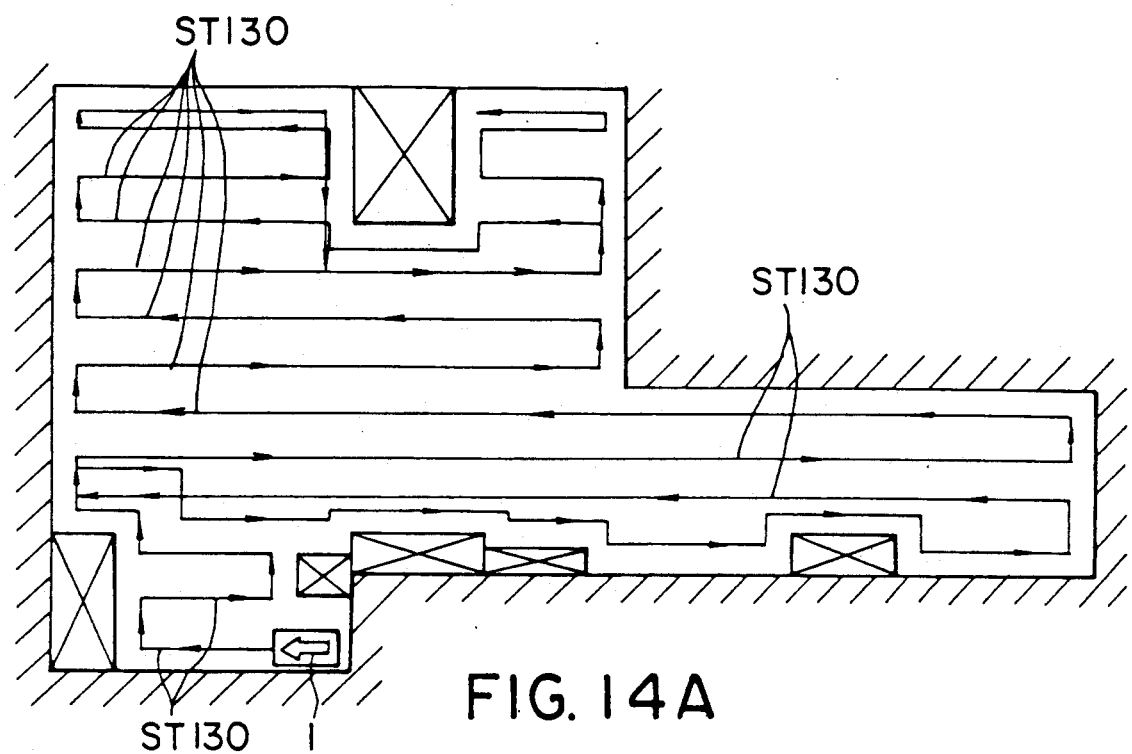
Figure 14B:
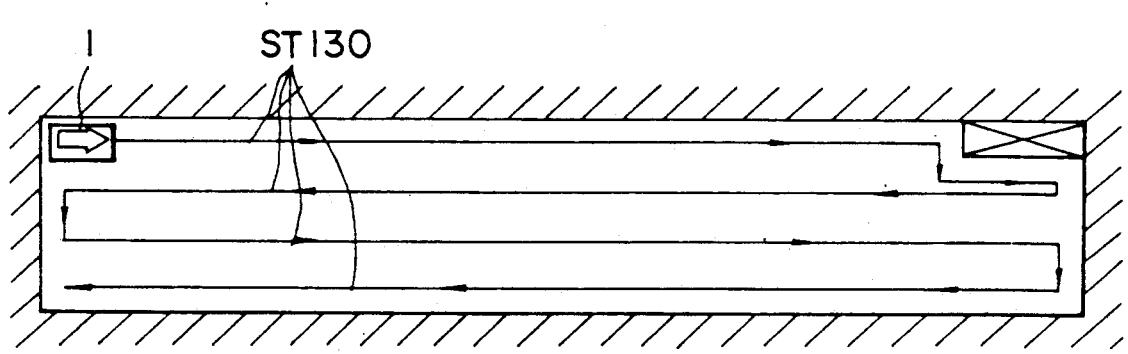
Figure 14C:
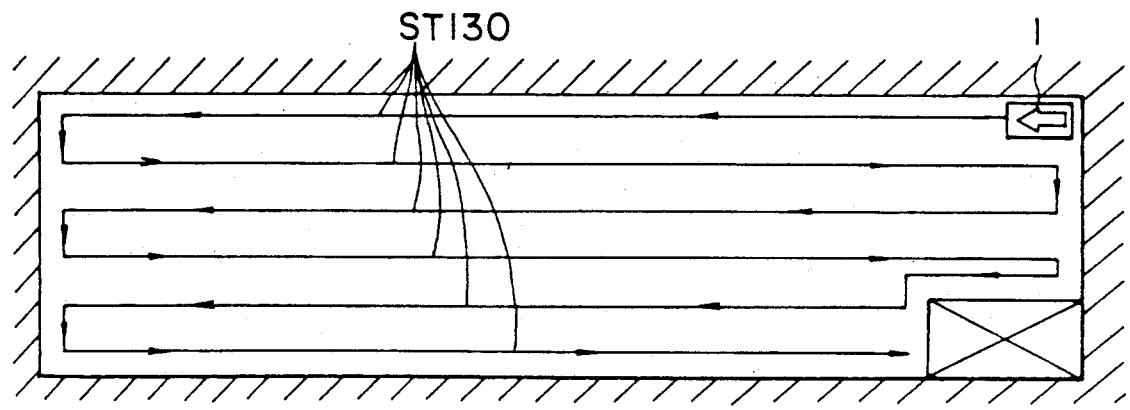
Figure 15:
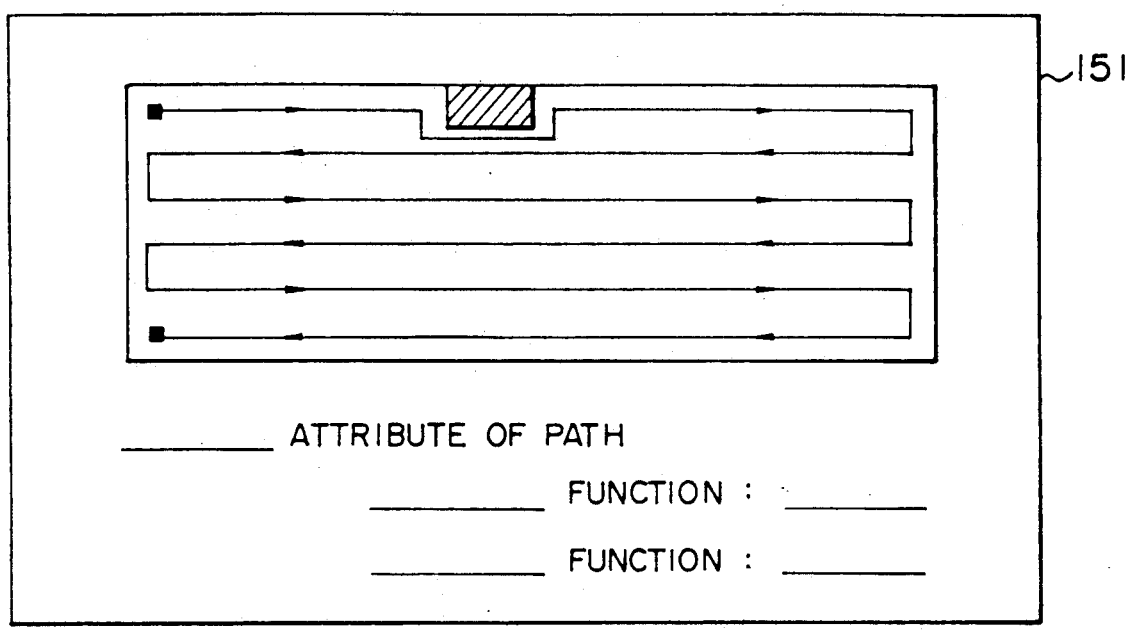
FIGS. 15 and 16 are a front view and a flowchart showing an input picture and a setting procedure in regard to the path attribute setting in the control apparatus of the first embodiment, respectively.

A practical algorithm for determining such a running path will be described with reference to the flowchart of FIG. 13 and FIGS. 14A, 14B and 14C.

Where the cleaning area is an area like a square room where no obstacle is placed, the control unit 11 equally divides the cleaning area in consideration of the lapping quantity in cleaning by the cleaner 1 so that the cleaner 1 can carry out a cleaning work without uselessness along any direction of a room, to thus determine a running path. At this time, the control unit 11 allows for not only the lapping quantity but also a starting position, a moving direction and a preferential direction. The determination of the running path based on equal division may be carried out, e.g., in the case of a rectangular room, in consideration of whether running along the long side of the rectangular room is more efficient than the running along the short side thereof, or vice versa. Since such a space where no obstacle is placed is rather rare in practice, in most case, a running path capable of cleaning with high efficiency while avoiding an obstacle is determined in accordance with the following algorithm.

Where the cleaning area is not simply rectangular and obstacles are placed at various places, an approach is employed to input the shape of this area and position of the obstacles, etc. into the control unit 11, thus to determine a running path for carrying out a cleaning work with the highest efficiency. When the automatic cleaner 1 cleans a room situated as shown in FIGS. 14A to 14C and the cleaning work start, position by the cleaner 1 is assumed as shown, a fixed directed in which the robot 1 can run while cleaning is determined as indicated by the step ST130 of FIG. 13. Namely, the straight advance running path is determined. Then, a running path is computed in connection with the area limitation in a straight advance direction and a lateral direction also in consideration of the size of each obstacle. The outline thereof is basically as shown in FIG. 13. A judgement is made whether or not an obstacle can be sensed from input information when the robot 1 runs along the straight advance running path (step ST131). When that obstacle is sensed, a judgement is made as to whether or not the robot 1 can avoid that obstacle by a lateral traveling in a range which does not deviate from a lapping quantity (step ST133). Where the robot 1 avoid that obstacle, the robot 1 returns to an original running path when that obstacle becomes absent (step ST137). On the other hand, where an obstacle extends to the area limitation, the robot 1 turns reversely so that the running paths overlap with each other by a lapping quantity determined at the step ST84, and make a straight advance in an opposite direction (step ST143). For this reason, a judgment is made as to whether the robot 1 can be turned reversely from the situation of a room (step ST142). The robot 1 reversely runs until the area limitation results with respect to both the straight advance direction and the lateral traveling, direction to determine a running path so that the robot can carry out cleaning (step ST144).

Accordingly, even in the case of a room complicatedly situated as shown in FIG. 14A, the most efficient running path is determined. Where an obstacle cannot be avoided by any means, although running paths partially overlap with each other, a running path is determined so that there is no portion which cannot be completely subjected to cleaning Further, in the case of a considerably elongated room, it is most efficient to continuously run in a lengthwise direction. Accordingly, obstacles positioned at the corners of the room can be avoided whether running paths overlap with each other to some extent.

Figure 16:
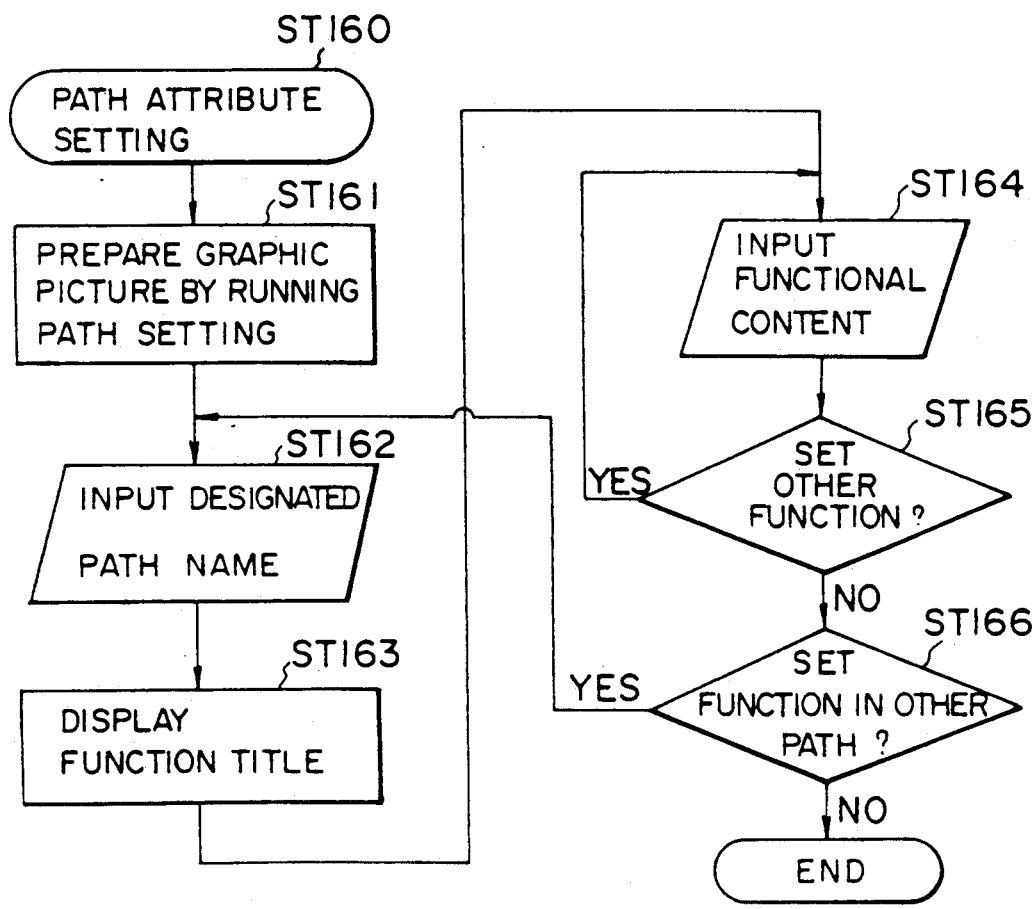

The processing carried out by the path attribute setting means 29 as indicated by the step ST160 of FIG. 6 will now be described. The necessary items at the time of setting the path attribute is shown by the path attribute setting picture 151 of FIG. 15. Further, as indicated by the flowchart of FIG. 16, the setting means 29 describes graphic pictures obtained by dividing the working area previously prepared at the running path setting means 28 (see step ST161).

Then, running path to which various attributes are required to be added is elected (see step ST162) to display an attribute menu stored in advance in the memory medium to selectively input the content of that attribute (see steps ST163 and ST164). Where there is a need to add another attribute function to the above-mentioned running path, the content of that attribute is selectively input in a manner similar to the above, thus to set an attribute required for this path (see step ST165). Further, with respect to other running paths, setting of various attributes is similarly made (see step ST166).

The contents of various attributes will now be described. The attribute in this embodiment is roughly classified into the environmental condition, the cleaning condition 1, the cleaning condition 2, and the running condition. With respect to the environmental condition, floor member, wall member, temperature and humidity can be set as the attribute. With respect to the floor material, by setting material of the floor member as the attribute, an optimum pressure and the number of revolutions of a brush or a pad corresponding to that floor member can be set. This is because the pressure and the number of revolutions of a brush or a pad adapted to the hardness of the floor and unevenness of the floor surface, etc. is set. With respect to the wall member, by setting material of that wall member, an optimum obstacle sensor corresponding to the wall member can be set. Namely, because measurements cannot be made by a laser sensor in the case where the wall member is glass, a ultrasonic sensor is set. On the other hand, because a measurement can be made by both a ultrasonic sensor and a laser sensor in the case of a concrete, e.g., a laser sensor capable of making a measurement in this embodiment is set. With respect to the temperature. By measuring temperature at the place where cleaning will occur as the attribute, the speed of the automatic cleaner 1 at the time of wet cleaning can be set to an optimum speed corresponding to the temperature. When the surface rinsing and cleaning is carried out, wax is ordinarily exfoliated by the chemical reaction of a cleaning material. Accordingly, a difference between reaction times due to the magnitude of the is corrected by a running speed, thus permitting a setting such that the finishing state of cleaning is uniform at all times. With respect to the humidity, by setting a humidity at a place subject to cleaning as the attribute, the quantity of a cleaning liquid or water at the time of wet cleaning can be set to an optimum liquid quantity corresponding to the humidity. This is because when the humidity is low, the floor surface is dried, requiring a greater quantity of liquid, while when the humidity is high, cleaning can be sufficiently made by a small quantity of liquid.

With respect to the cleaning condition 1, the content of the cleaning work can be set as the attribute. As the content of the cleaning work, three kinds of cleaning modes, i.e., wet cleaning, dry cleaning and vacuum cleaning can be set. With respect to the cleaning condition 2, it can be set in dependency upon the states of the floor surface each occasion, e.g., the state where the floor surface is very dirty, the state where that surface is not so dirty, or the like in connection with the pressure of brush or pad, the number of revolutions thereof, and a quantity of scattering of a cleaning liquid. Accordingly, cleaning work is ordinarily conducted on the basis of information set by the environmental condition in the cleaning area. On the other hand, in running paths where a cleaning work parameter is required to be newly set, setting is made by the cleaning condition 2 to conduct cleaning corresponding to respective floor surfaces.

With respect to the running condition, in running paths where a cleaning speed is required to be newly set, setting is made by a running condition corresponding to the speed set by the environmental condition in the same manner as in the cleaning condition 2, thus to set speeds corresponding to respective running paths.

Figures 17, 18:
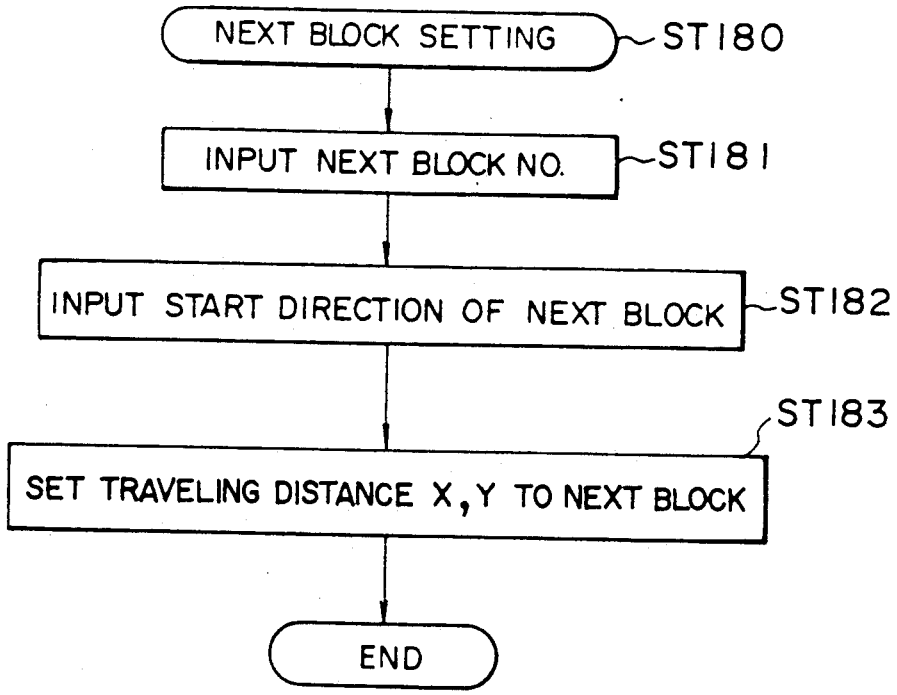
FIGS. 17 and 18 are a front view and a flowchart showing an input picture and a setting procedure in regard to the next block setting in the control apparatus of the first embodiment, respectively.
Figure 19:
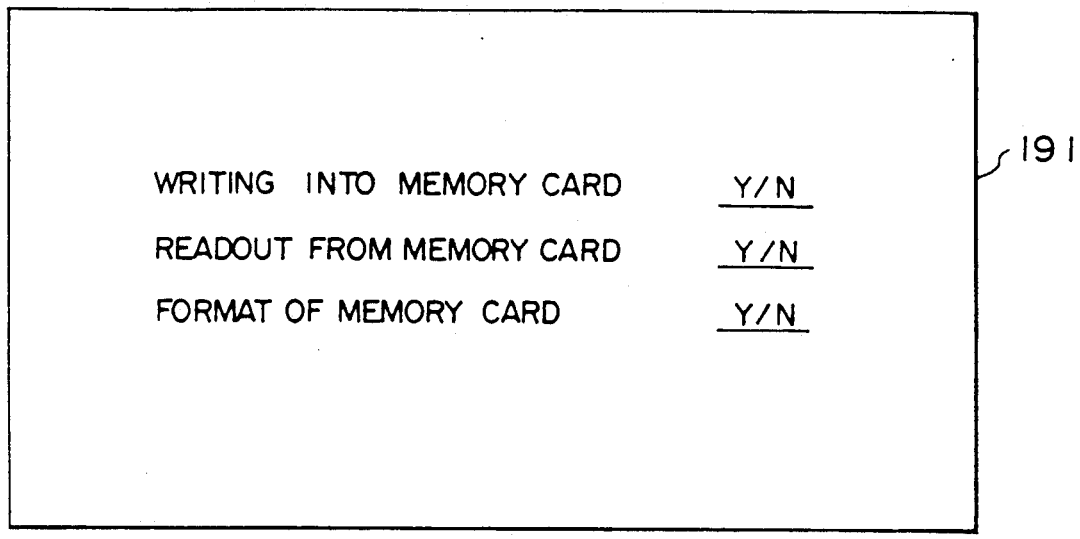
FIGS. 19 and 20 are a front view and a flowchart showing an input picture and a setting procedure in regard to the memory card management in the control apparatus of the first embodiment, respectively.

The processing carried out by the block setting means 33 as indicated by the step ST180 of FIG. 6 will now be described. The necessary items at the time of setting a next block is shown by a next block setting picture 171 of FIG. 17. As shown in the flowchart of FIG. 18, a number of a next block is first inputted thereafter to input a start direction of the next block (see steps ST181 and ST182). This indicates a direction of the start position of the next block relative to the last cleaning completion position. Eight directions (front, behind, left, right, front left, front right, behind left, behind right) can be designated. Then, a moving distance up to the start position of the next block is inputted by the coordinates (X, Y), thus to set the next block (see step ST183).

Figure 20:
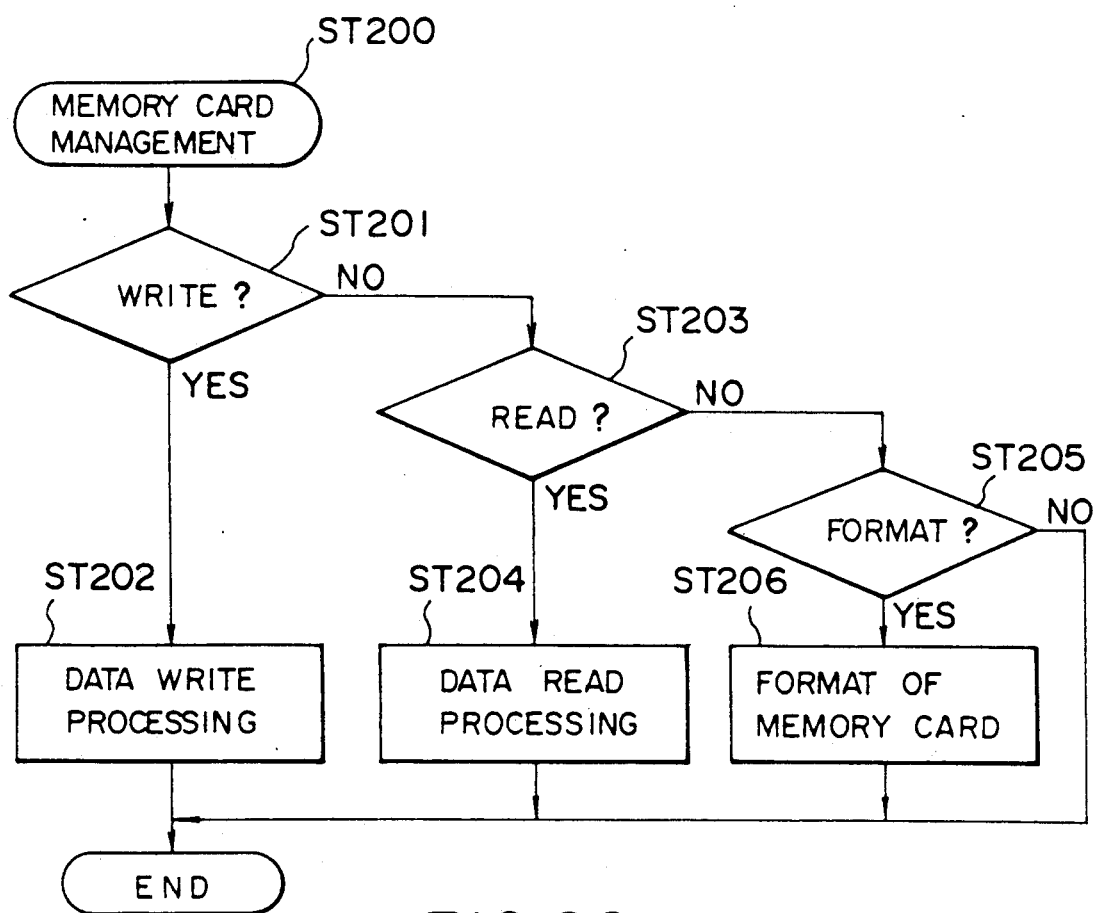
Figure 21:
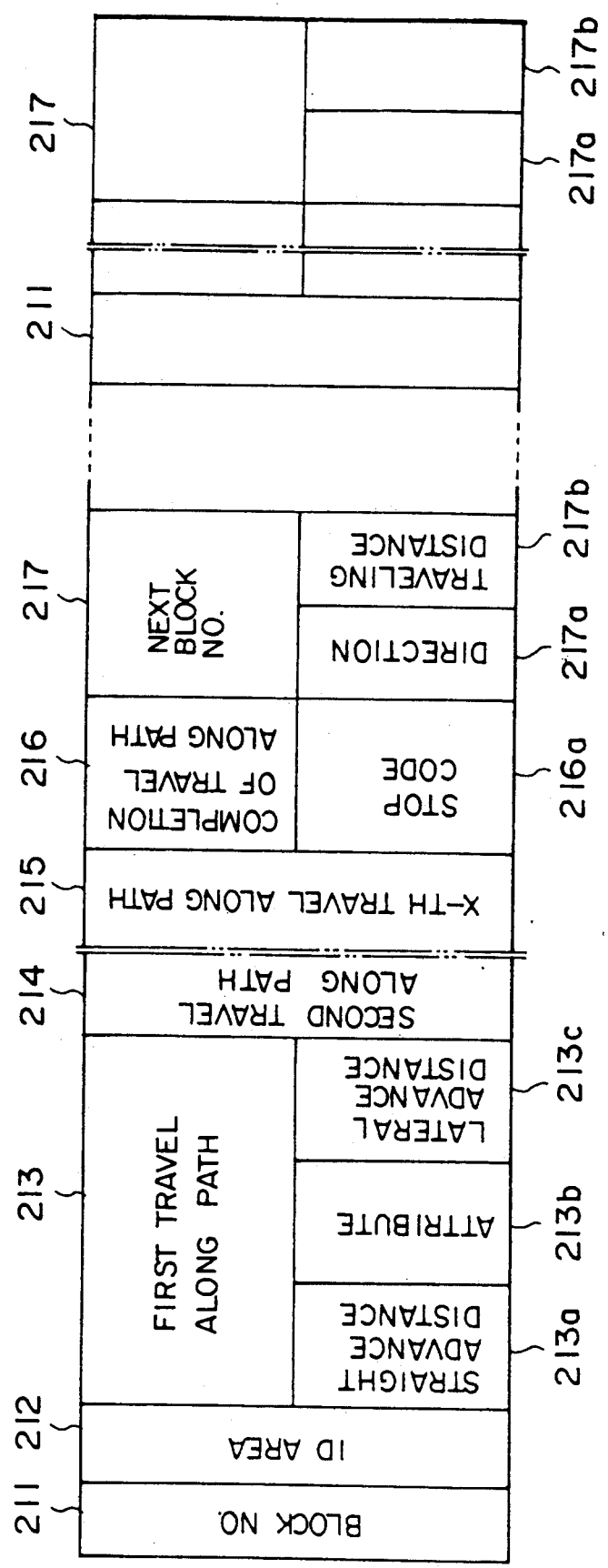
FIG. 21 is a format diagram showing contents recorded into the memory card in the control apparatus of the first embodiment.

The processing carried out by the memory card management means 30 as indicated by the step ST200 of FIG. 6 will now be described. The necessary items at the time of the memory card management is shown by a memory card management picture 191 of FIG. 19. As indicated by the flowchart of FIG. 20, in the case of attempting to store data into the memory card 32 at the time of start of the cleaning information setting means 21, the memory card management means 30 selects a write processing (see step ST201) to write cleaning information set by the running area setting means 26 to the next block setting means 33 into the memory card 32 (see step ST202). Further, in the case of attempting to make a reference to or modify information already written into the memory card 32, the memory card management means 30 selects a readout processing (see step ST203), thus to initiate readout operation of cleaning information set by the running path setting means 28 to the next block setting means 33 (see step ST204). Furthermore, in the case of attempting to utilize the memory card 32 at the working information setting means 21, the memory card management means 30 sets a format (see step ST205) to initiate a format initialization of the memory card 32 (see step ST206). The content or format of the memory card 32 is shown in FIG. 21. As seen from this format, a block No. set by the running area setting means 26 is stored into the address 211, and information of an ID area set by the running area setting means 26 and the obstacle setting means 27 are stored into the address 212. Further, information set by the running path setting means 28, i.e., a straight advance distance and a lateral travel distance are stored into the addresses 213a and 213c, respectively. In addition, information set by the path attribute setting means 29 is stored into the address 213b. Such operations are repeated X times with respect to the running path. A stop code indicating termination of the running path is stored into the address 216a. Then, a next block No. set by the next block setting means 33 is stored into the address 217, a direction of the next block and a moving distance are stored into the addresses 217a and 217b, respectively. In accordance with the above-mentioned format, information corresponding to the entire blocks are stored. The end of block can be set by inputting a block end code when setting a next block No. by the next block setting means 33. The operation of the cleaning information setting means 21 has been described as above.

Figure 22:
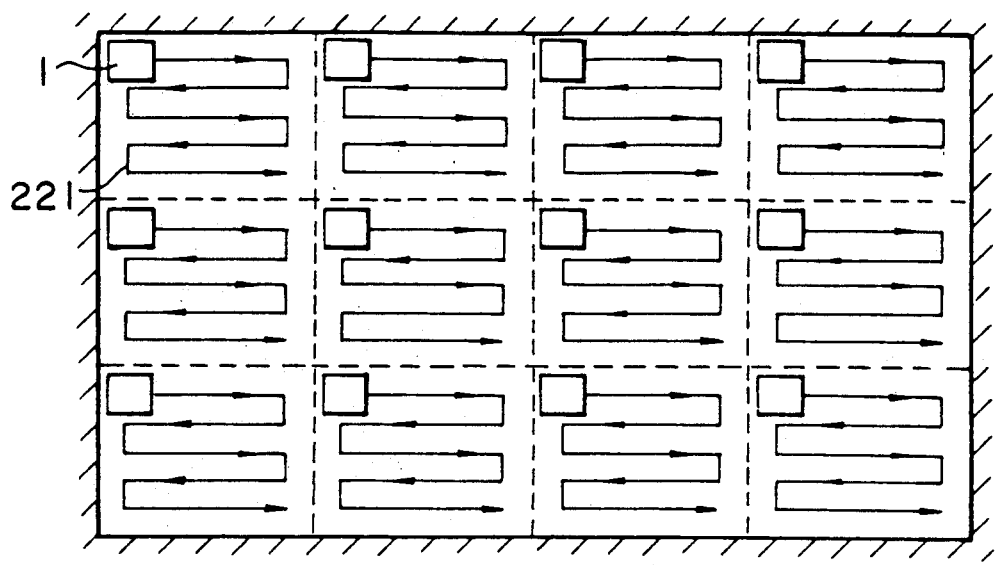
FIGS. 22 and 23 are plan views showing running patterns of an automatic cleaning robot according to the first embodiment.
Figure 23:
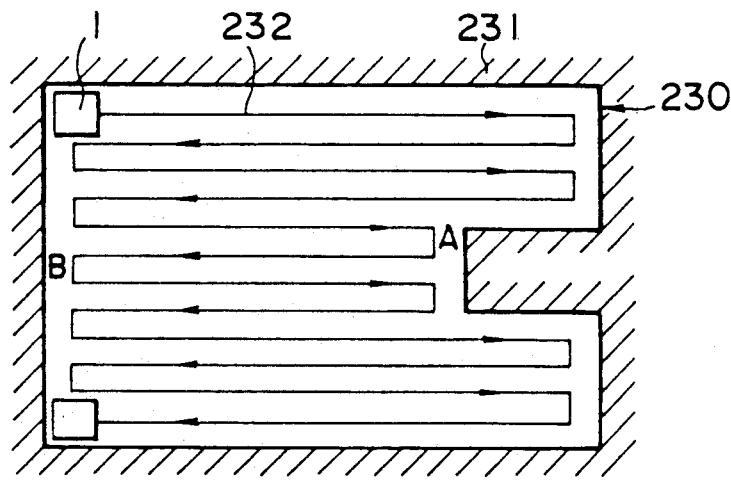

Various setting operations on a on-line basis without using the cleaning information setting means 21 will now be described. By using the manipulation panel 17a of the manipulation unit 17 of the automatic cleaner 1, a cleaning speed, a pressure of the brush or the pad, the number of revolutions of the brush or the pad, and a quantity of scattering of a cleaning liquid are set, and one of wet cleaning, dry cleaning, and vacuum cleaning is selected. Then, by using the manipulation panel 17a of the manipulation unit 17, a direct advance running distance and the number of turning-back operations are inputted to set a cleaning area thereafter to initiate the automatic cleaning. In this method, in the case of a broad cleaning area (e.g., 100 m × 100 m), as shown in FIG. 22, running paths 221 are determined every several ten meters thus to partition the cleaning area. Before there occurs an attitude error by the drift of the direction sensor 16a provided for performing an attitude control, the cleaning work of the partitioned cleaning areas is completed. Thus, even if correction means for correcting an attitude error (a marker is attached on the floor surface, a tool for correction is affixed thereon, or the like) is not provided, a broad cleaning area can be subjected to cleaning everywhere. Further, in the case where an obstacle 231 such as a wall or a pillar, etc. is installed in the area 230 before a set straight advance running distance as shown in FIG. 23, an approach is employed to store a distance up to that obstacle such as a wall or a pillar, etc. to conduct a lateral travel by the stored distance thereafter to allow the robot 1 to run in an opposite direction, thus to determine a running path 232 (a position A in FIG. 23). Then, after lateral travel, the cleaner 1 is caused to run in an opposite direction by the initially set straight travel distance (a position B in FIG. 23). By repeating such operations, cleaning can be conducted everywhere even in the uneven cleaning region 230.

As described above, in accordance with this embodiment, automatic cleaning can be satisfactorily conducted even if there is no guide object such as a wall surface.

Figure 24:
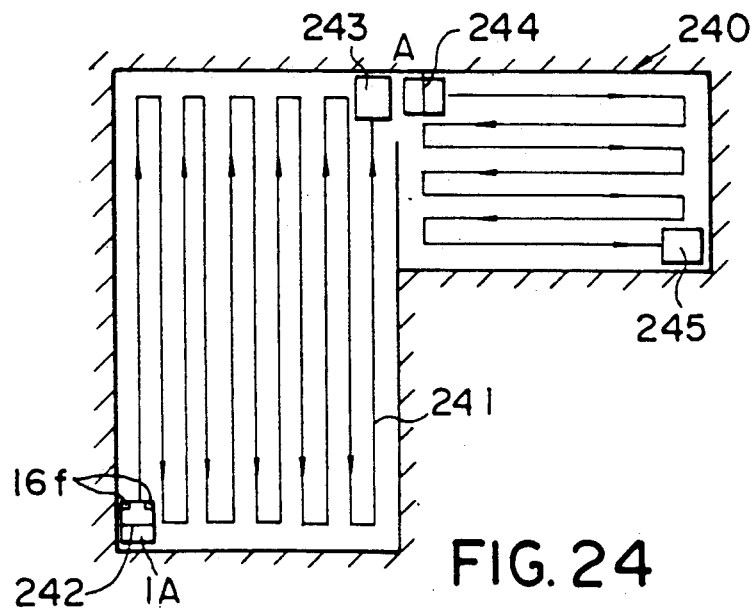
FIG. 24 is a plan view showing a running pattern of an automatic cleaning robot according to a second embodiment of this invention.
Figure 25:
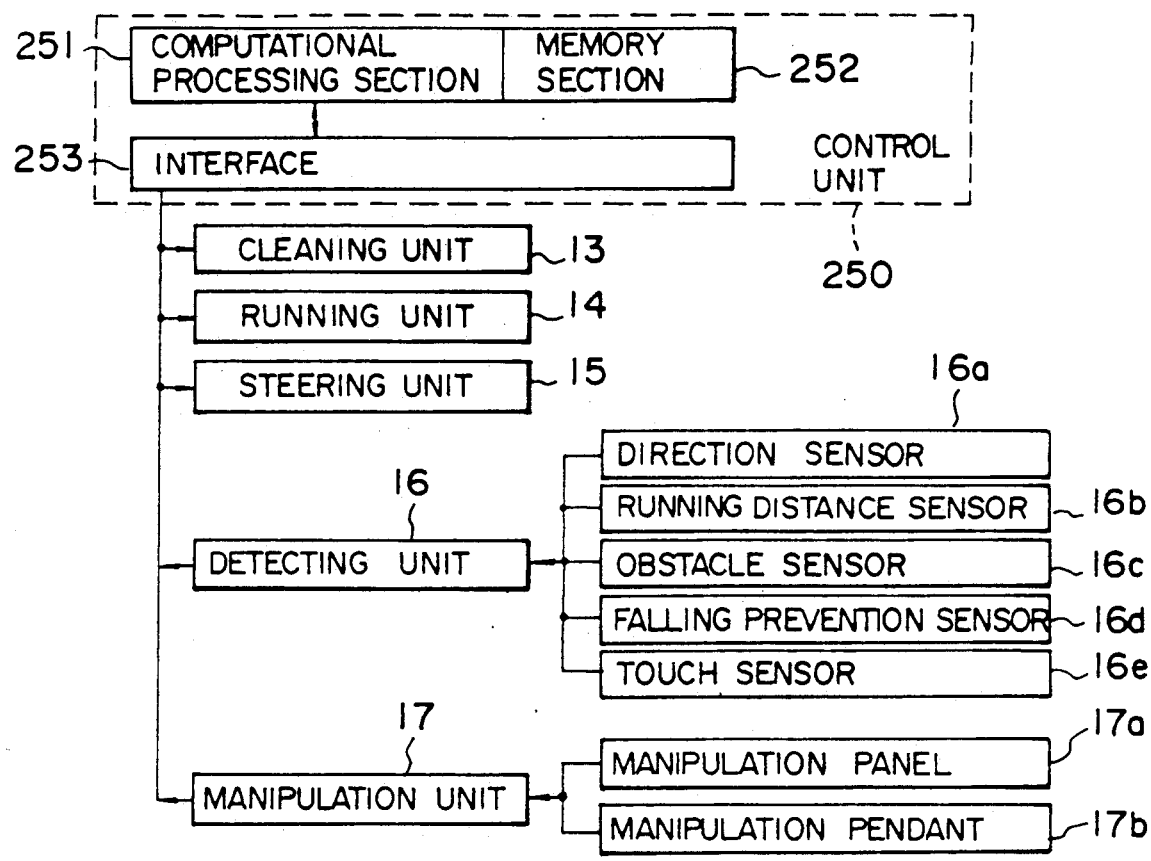
FIG. 25 is a block diagram showing the functional configuration of an automatic cleaning robot as an example of a conventional control apparatus.
Figure 26:
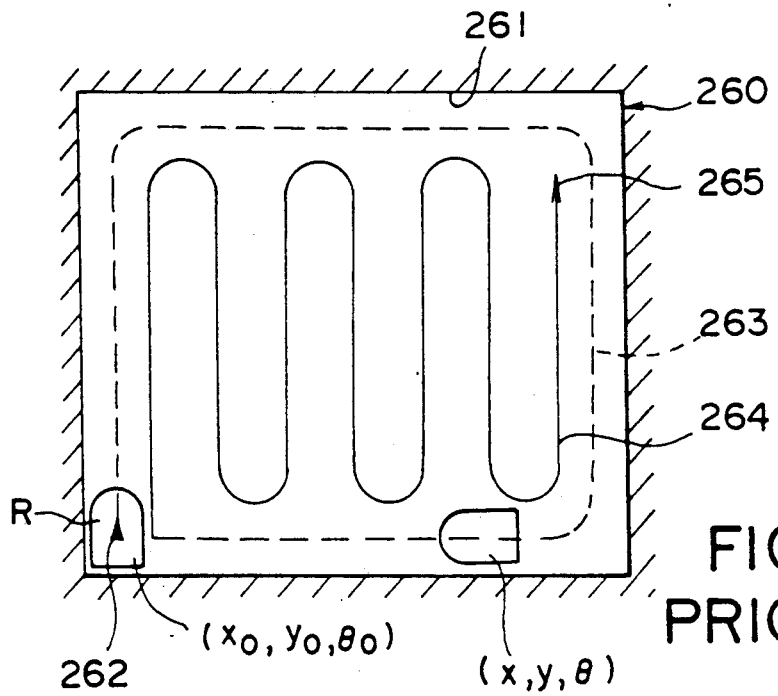
FIG. 26 is a plan view showing a running pattern of the robot shown in FIG. 25.

A second embodiment of an automatic cleaning device according to this invention will now be described with reference to FIG. 24. In the automatic cleaner 1A of the second embodiment, there is additionally provided an attitude sensor 16f in the automatic cleaning device 1 of the first embodiment shown in FIG. 1. This cleaning device is used in a cleaning area 240 where an optical reflection mark 244 such as a metal plate, etc. is attached on the floor surface.

The operation of the automatic cleaner 1A of the second embodiment will be described by taking an example where a broad cleaning area 240 such as a platform, etc. is subjected to cleaning. The setting of cleaning information is carried out in a manner similar to that in the first embodiment. Initially, a broad cleaning area is partitioned into a plurality of blocks by using the working information setting means 21.

This is carried out for the purpose of correcting a drift by the gyro-device. After various working conditions in respective blocks are set, they are stored into the memory card 32. The memory card 32 thus stored is inserted into the automatic cleaner 1A to manually guide the automatic cleaner 1A so that it is located at a start position 242 of the first block shown in FIG. 24. Then, by depressing a start button for an automatic cleaning of the manipulation panel 17a, an automatic cleaning is initiated along a running path 241. After an automatic cleaning is initiated, an optical reflection mark such as a metal plate, etc. attached on the floor surface is sensed by attitude sensors 16f (optical sensor or laser sensor, etc.). Then, an inclination of the automatic cleaner 1A is calculated from a time difference between left and right attitude sensors 16f. Thus, cleaning is conducted in accordance with cleaning information such as path 241, etc. set by using the cleaning information setting means 21 while correcting that inclination. When cleaning of the first block is completed at the position of completion 243, the automatic cleaner is automatically moved to a start position 244 of the second block in accordance with a direction and a moving distance of the next block set by the working information setting means 21. In a manner as stated above, cleaning is conducted in accordance with various cleaning conditions while correcting an inclination of the automatic cleaner 1A. By implementing such operation to the entire blocks set, the automatic cleaner 1A is caused to run up to the final completion position 245 to conduct an automatic cleaning of a broad cleaning area such as a platform, etc.

As described above, in accordance with the second embodiment, the same advantages as those of the first embodiment can be provided. Further, as the result of the fact that a drift of the direction sensor 16a can be corrected, an automatic cleaning can be conducted even in the case where the cleaning area is a broad area such as a platform, etc.

It is to be noted that while the memory card is used as a medium for transmitting cleaning information in the first and second embodiments, this invention is not limited to such a memory card. For example, a floppy disk or a bubble cassette may be used. In addition, communication means by a radio wave modem may be utilized.

Further, while an optical reflection mark such as a metal plate, etc. is used for modification of an attitude at a start position of a next block in the second embodiment, a magnetic mark may be used to sense this magnetic mark by a magnetic sensor, or a paint mark may be used to sense this paint mark by an image sensor.

What is claimed is:

1. A control apparatus for a floor cleaning robot comprising a running unit for running on a plane surface as a working object, a steering unit for steering said running unit in a predetermined direction, a cleaning unit for cleaning said plane surface, a detecting unit for detecting information about running direction and distance of said robot and an obstacle on said plane surface, and a control unit for controlling running and cleaning of said robot on the basis of said informations from said detecting unit, characterized by the provision of:

working information setting means for setting a cleaning area where said cleaning is conducted to set an optimum working running path within said cleaning area thus set by a predetermined algorithm, and comprising data processing means for processing various data in regard to cleaning that said robot conducts, a data storage unit for storing said various data, a data input unit for inputting predetermined data into said processing means, and a display unit for displaying data contents in order to set said various data; and working control means for controlling said running unit and said steering unit so that said running unit runs along said working running path set by said working information setting means and for controlling said working unit to carry out said cleaning; and wherein said processing means comprises running area setting means for setting a cleaning area as an area where said robot should carry out cleaning; obstacle setting means for setting a position of an obstacle within a cleaning area set by said area setting means; running path setting means for setting a running path in accordance with a predetermined algorithm so that cleaning is carried out on the basis of data set by said two setting means; path attribute setting means for adding a path attribute peculiar to a running path set by said path setting means; next block setting means wherein when said cleaning area is a broad area and/or is in a complicated form, said next block setting means divides said area into several blocks to make a setting every block such that cleaning can be conducted while avoiding said obstacle; and storage unit management means for allowing said data storage unit to store a cleaning/running path set by said respective setting means.

2. A control apparatus as set forth in claim 1 wherein said running path setting means prepares a graphic picture on the basis of a running area and information of an obstacle to first set a basic running path by inputting a work starting point and a traveling direction thereafter to make a fine setting of a path along which said working robot avoids an obstacle and is reversely turned in accordance with said basic path.

3. A control apparatus as set forth in claim 1 wherein said running path setting means basically first forms a running path along the length side of a room thereafter to set a lateral travel running path for avoiding an obstacle and/or reversing said running path with respect to a straight advance path in the length direction.

4. A control apparatus as set forth in claim 1 wherein said data storage unit is comprised of a memory card storage unit using a memory card as the memory medium, and wherein said management means conducts a management writing information into said memory card and/or reading it therefrom.

5. A control apparatus as set forth in claim 1, wherein said detecting unit comprises a direction sensor for sensing an angle of attitude for an attitude control of said running unit, a running distance sensor for sensing a running distance of said running unit, an obstacle sensor for sensing an obstacle on a wall surface and a floor surface.

6. A control apparatus as set forth in claim 5, wherein said detecting unit further comprises a falling prevention sensor for preventing said robot from being fallen down from said plane surface, and a touch sensor provided on a front of said robot.

7. A control apparatus as set forth in claim 6, wherein said touch sensor is comprised of left and right attitude sensors which provide a time difference with said control unit, to calculate an inclination of said robot.

* * * * *